United States Patent [19]
Ogawa

[11] Patent Number: 5,207,610
[45] Date of Patent: May 4, 1993

[54] APPARATUS FOR REMOVING ROE

[75] Inventor: Yutaka Ogawa, Ibaraki, Japan

[73] Assignee: Nippon Fillestar Co., Ltd., Osaka, Japan

[21] Appl. No.: 845,249

[22] Filed: Mar. 3, 1992

[51] Int. Cl.$^5$ ............................................ A22C 25/00
[52] U.S. Cl. ...................................................... 452/110
[58] Field of Search ......................................... 452/110

[56] References Cited

U.S. PATENT DOCUMENTS

| | | | |
|---|---|---|---|
| 3,793,676 | 2/1974 | Wiggins | 452/110 |
| 4,332,057 | 6/1982 | Smith | 452/110 |
| 4,800,626 | 1/1989 | Wastell | 452/110 |
| 4,955,110 | 9/1990 | Ogawa | 452/110 |
| 5,085,613 | 2/1992 | Ketels | 452/110 |
| 5,112,271 | 5/1992 | Urushibara et al. | 452/110 |

FOREIGN PATENT DOCUMENTS 61-195638 8/1986 Japan.

Primary Examiner—Willis Little
Attorney, Agent, or Firm—Wenderoth, Lind & Ponack

[57] ABSTRACT

An apparatus includes a pressing device that elastically presses the abdomen of fish body which has been decapitated and which is conveyed in a downstream conveying direction, from the vicinity of a tail of the fish body to a neck thereof. The pressing device is both flexible and elastic and is rotated and driven about a rotary axis. Thereby, ovaries are removed from the abdominal cavity of the fish body. Since the pressing device is rotated and driven about the rotary axis, the abdomen of the fish body conveyed in the downstream conveying direction can be continuously pressed from the tail to the neck. Since the pressing device is flexible and elastic, it does not press the fish body with an excessively large force, and the ovaries can be removed smoothly from the abdominal cavity without destroying the fish body. Thereby, a roe collecting operation can be conducted continuously by disposing fish bodies closely adjacent each other in the conveying direction, and the efficiency of the roe collecting operation can be enhanced.

9 Claims, 13 Drawing Sheets

APPARATUS FOR REMOVING ROE

BACKGROUND OF THE INVENTION

1. Field of the Invention

The present invention relates to an apparatus for removing roe by pressing the abdomen of a decapitated fish body.

2. Description of the Prior Art

A known apparatus for removal of roe from the abdominal cavity of a fish body conveys the decapitated fish body and presses the abdomen by pressing means composed of, for example, a long pushing bar.

In such prior art arrangement, the pushing bar contacts headless fish bodies sequentially conveyed in a downstream conveying direction. As a fish body is conveyed in the downstream conveying direction while the pushing bar is abutting against the abdomen, the abdomen of the fish body is pressed against the pushing bar, so that the ovaries are extracted from the abdominal cavity. Thus, when the abdomen of a fish body is being pressed by the pushing bar, as this fish body is moved from the tail end side to the vicinity of the neck, it is curved in the upstream direction. Therefore, another fish body disposed adjacently and of the first fish must be located at a sufficient clearance therefrom to ensure that it does not contact the first downstream fish body. Therefore, the roe collecting operation is suspended after removing the roes from the first fish until the next fish abuts against the pushing bar. The efficiency of such roe removal process is poor.

SUMMARY OF THE INVENTION

It is hence a primary object of the invention to provide an apparatus for removing roe and that is capable of improving efficiency of the roe removal operation.

To achieve the above object, the invention provides an apparatus for removing roe comprising means for conveying a decapitated fish body in a downstream conveying direction, and means for elastically pressing the abdomen of the fish body from the tail end thereof to the neck end thereof, such pressing means being flexible and rotating about a rotary axis.

According to the invention, the abdomen of the decapitated fish body is elastically pressed from the tail end thereof to the vicinity of the neck thereof by flexible and elastic pressing means, so that the ovaries are pushed out from the abdominal cavity of the fish body. Since the pressing means is rotated and driven about the rotary axis, the abdomen of the fish body conveyed in the downstream conveying direction can be continuously pressed from the tail to the neck. Moreover, since the pressing means is flexible and elastic, it does not press the fish body with an excessively large force, and the ovaries can be removed smoothly from the abdominal cavity without destroying the fish body. Therefore, as compared with a mechanism that, so to speak, squeezes out the roe while curving the fish body upstream of the conveying direction with the abdomen of the fish body in contact with a pushing bar, the invention is intended to push out the ovaries from inside the abdominal cavity by applying pressure elastically to the abdomen of the fish body from the tail to the neck thereof. In the invention, it is not necessary to curve the fish body, so that the roe collecting process may be done continuously by disposing the fish bodies from which ovaries are to be removed closely adjacent in the conveying direction. Hence, the efficiency of the roe removal operation is enhanced.

According to the invention, since the abdomen of the fish body conveyed in the downstream conveying direction is pressed by pressing means from the tail of the fish body to the neck thereof, the abdomen can be pressed without deforming the fish body when pressing the abdomen. Therefore, the intervals between the fish bodies can be reduced in the conveying direction, and efficiency of the roe removal process can be enhanced.

In a preferred embodiment, the pressing means includes a rotary shaft rotated and driven about a horizontal rotary axis, and a rotating element fixed on the rotary shaft. The rotating element includes a cylindrical base portion having therein a passage receiving the rotary shaft. Plural pressing members are mounted on the outer circumference of the base portion and extend radially outwardly therefrom. A cover member surrounding the pressing members is made of flexible and elastic material. The rotary axis of the rotary shaft is inclined to the conveying direction and diverges relative thereto from the tail end of a fish body being conveyed to the neck end thereof.

In another preferred embodiment, the pressing means includes a rotary shaft rotated and driven about a rotary axis parallel to the conveying direction, plural arms fixed to the rotary shaft at intervals spaced along the rotary axis, and pressing members fixed at free ends of respective arms, and made of flexible and elastic material.

In a different preferred embodiment of the invention, the rotary shaft is formed in a cylindrical shape having a central passage, and a spring urging the arm upstream of the conveying direction is located in the central passage. The arm is movable downstream of the conveying direction by overcoming the spring force of the spring.

In a further different preferred embodiment, a base end portion of the arm is pivoted to the rotary shaft and is movable angularly upstream and downstream of the conveying direction.

In a further different preferred embodiment, the pressing means includes a rotary shaft rotated and driven about the rotary axis parallel to the conveying direction. Plural pairs of support members are fixed at base end portions thereof to the rotary shaft. A roller is rotatably mounted to a free end portion of each support member to extend parallel to the rotary shaft. Each roller is flexible and elastic.

In a further different preferred embodiment, the pressing means includes a rotary shaft rotated and driven about the rotary axis parallel to the conveying direction. Pressure members possessing flexibility and elasticity are disposed in plural rows parallel to the rotary axis. Members in each row are spaced at intervals along the rotary shaft.

In a further preferred embodiment, the pressing means comprises a rotary shaft rotated and driven about a rotary axis parallel to the conveying direction. Cylindrical arms are fixed at base end portions thereof to the rotary shaft. A pressing member is disposed dislocatably along the axis of each arm at a free end portion thereof, and a spring housed in the arm urges the pressing member with spring force in a radial outward direction.

In a further preferred embodiment, the pressing means includes plural rollers having rotary axes at right angles to the conveying direction. The axial lengths of the rollers increase in the downstream conveying direction.

In a further preferred embodiment, the pressing means includes plural endless pressure belts extending in the conveying direction. Upstream ends of the belts are disposed sequentially move downstream from tail ends of the fish bodies to neck ends thereof.

In a further preferred embodiment, the pressing means includes a rotary shaft rotated and driven about a rotary axis parallel to the conveying direction. Pressing members each have an approximately spherical free end portion elastically projecting from a cylindrical base end portion mounted on the rotary shaft. The free end portion is soft compared with the base end portion.

In a further preferred embodiment, the pressing means includes a rotary shaft rotated and driven about a rotary axis parallel to the conveying direction. Plural finger elements are fixed at base end portions thereof of the rotary shaft and are flexible and elastic at the free end portion thereof.

BRIEF DESCRIPTION OF THE DRAWINGS

The above mentioned and further objects, features, and advantages of the invention will be more apparent from the following detailed description taken with reference to the accompanying drawings, wherein:

FIG. 1 is a sectional view seen from section line II—II in FIG. 1;

FIG. 4 is a schematic view showing a pressing member in another embodiment of the invention;

DETAILED DESCRIPTION OF THE PREFERRED EMBODIMENTS

Figure 1:
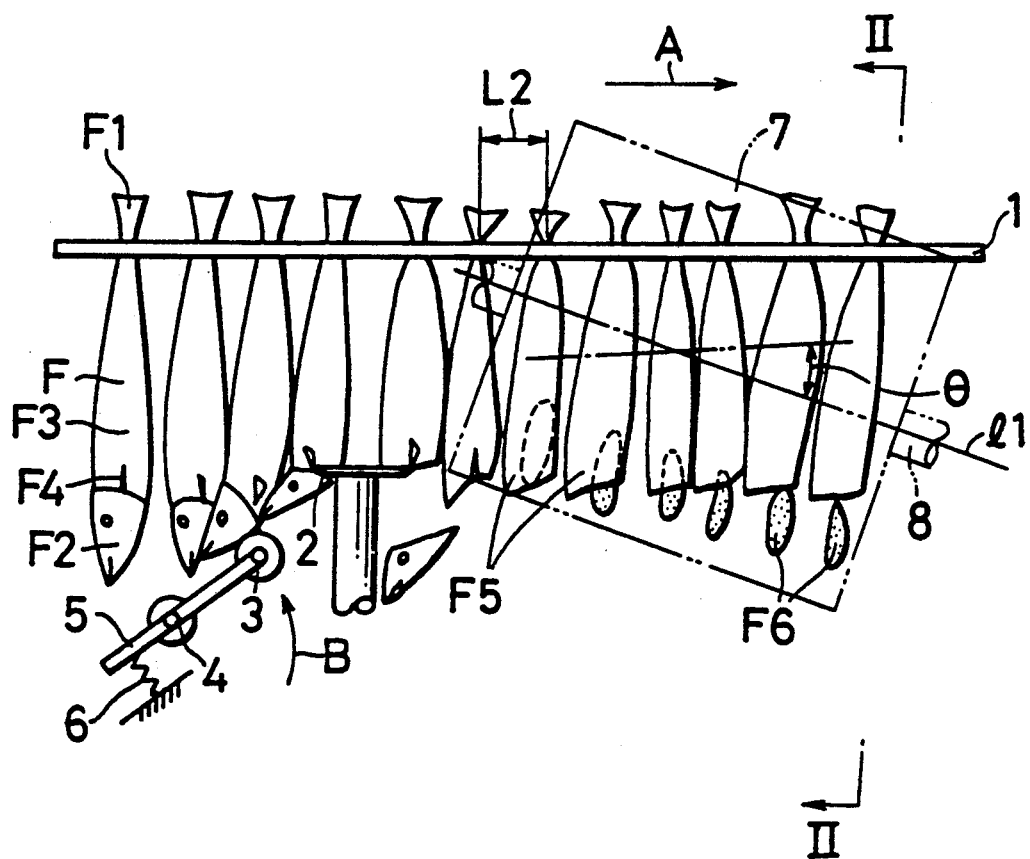
FIG. 1 is a simplified plan view showing a basic constitution of an embodiment of the invention.

Referring now to the drawings, preferred embodiments of the invention are described below.

FIG. 1 is a simplified plan view showing a basic constitution of an embodiment of the invention. Fish bodies F are pressed near tails F1 thereof by means of a chain 1 run and driven in the direction of arrow A, and are conveyed in a downstream conveying direction (arrow A). Each fish body F supplied to an upstream feed position, in the conveying direction A of the chain is conveyed in the downstream conveying direction A, while its head F2 is cut off by a rotary round decapitating knife 2 which is rotated and driven about a horizontal rotary axis. Near the upstream side in the conveying direction A of knife 2 is disposed a roller 3 which is intended to bend the head portion F2 of the fish body having an abdomen F3 in an upstream direction. Roller 3 is pivoted rotatably about a rotary axis, that is parallel to an axis of a shaft 4, at one longitudinal end of an oscillating member 5 disposed oscillatably about the axis of the shaft 4. One end of a tension spring 6 is fixed at an opposite longitudinal end of the oscillating member 5. An opposite end of tension spring 6 is fixed on the main body of the apparatus (not shown). Therefore, the spring force of the tension spring 6 elastically urges the oscillating member 5 in the direction of arrow B about the axis of the shaft 4. Therefore, the roller 3 elastically abuts against the head F2 of the fish body F conveyed in the downstream conveying direction A while allowing the fish body F to move in the downstream conveying direction A. The head F2 is angularly dislocated in the direction of arrow B, and the head F2 thus is bent so that the vicinity of the root of a pectoral fin F4 of the fish body F will be included in the head F2 side or portion to be cut off by knife 2.

The headless fish body F, without the pectoral fin F4 that thus was cut off together with the head F2, is conveyed in the downstream conveying direction A while being pressed by the chain 1. An abdomen portion F3 is elastically pressed by a pressing means 7 from the tail F1 to a neck F5 that was adjacent the head F2 prior to removal thereof.

Figure 2:
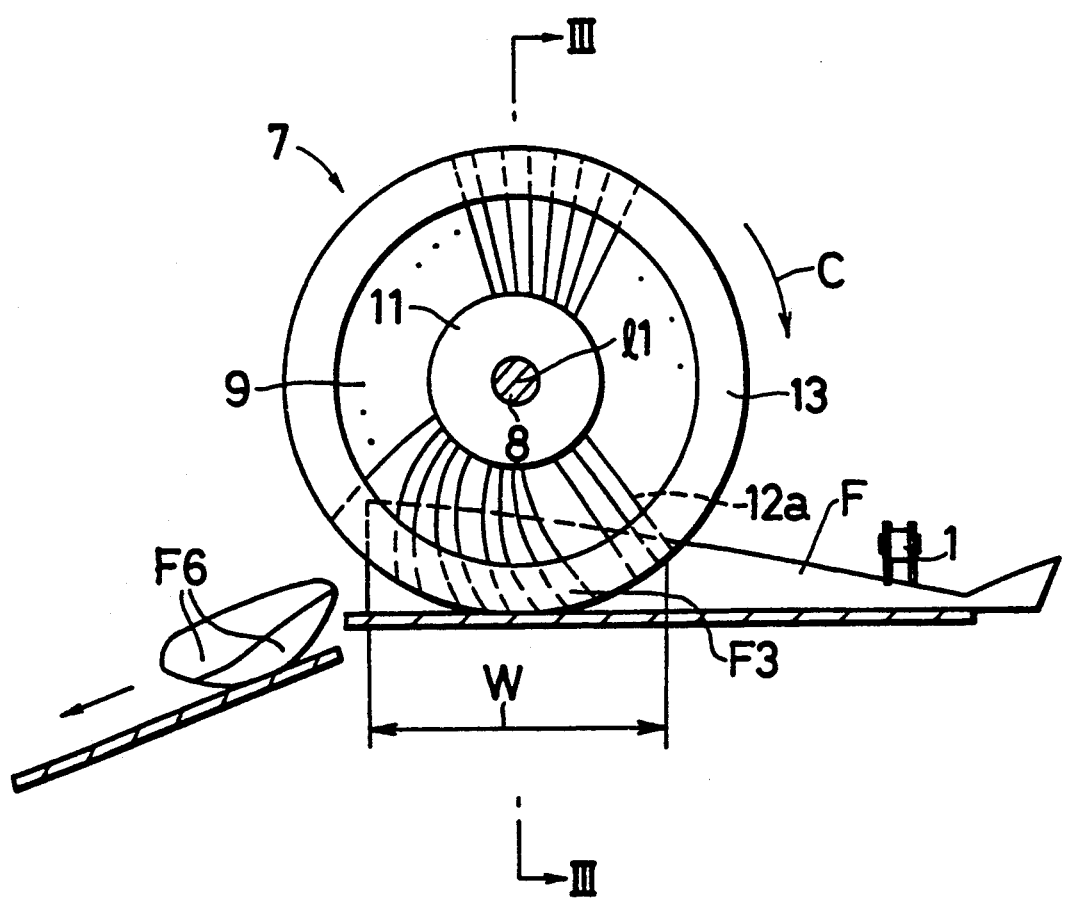
Figure 3:
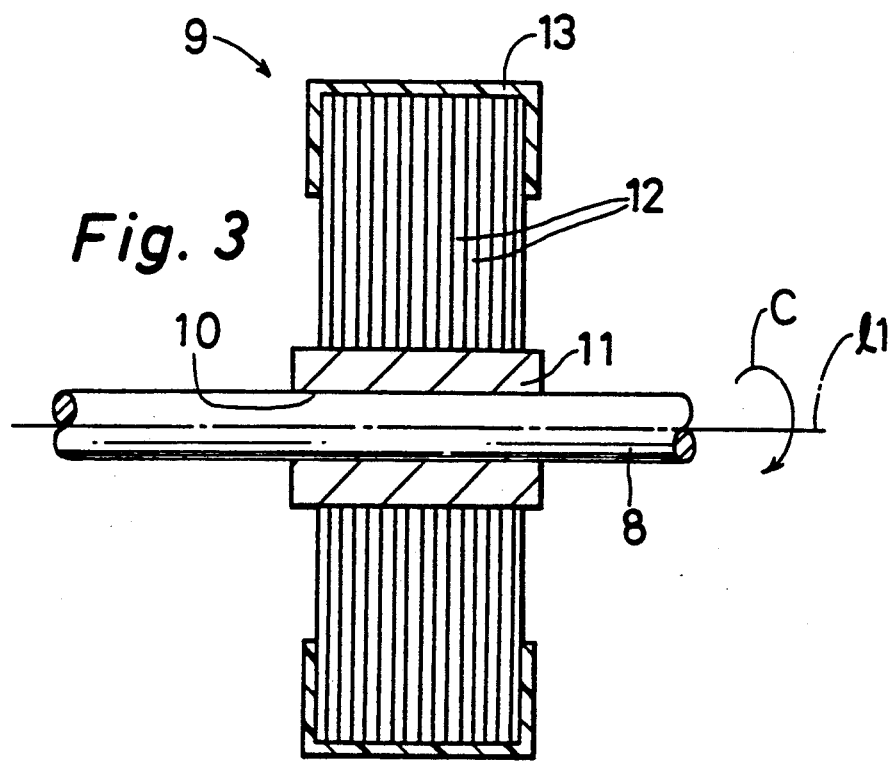
FIG. 3 is a sectional view seen from section line III—III in FIG. 2.

FIG. 2 is a sectional view as seen from section line II—II in FIG. 1, and FIG. 3 is a sectional view as seen from section line III—III in FIG. 2. The pressing means 7 includes a rotary shaft 8 rotated and driven in the direction of arrow C about a horizontal rotary axis 11, and a rotary element 9 fixed to rotary shaft 8 and rotated and driven therewith about the common rotary axis 11. The rotary element 9 includes a cylindrical base portion 11 having therethrough an insertion hole or passage 10 for receiving rotary shaft 8, plural pressing members 12 in the form of, for example, piano wires mounted on the outer circumferential surface of the base portion 11 and extending in radially outward directions therefrom, and a cover body 13 made of flexible and elastic material, such as rubber or synthetic resin, surrounding the pressing members 12.

The axis 11 of rotary shaft 8 is inclined at an angle of θ to downstream conveying direction A. Therefore, the abdomen portion F3 of each headless fish body F as it is conveyed in the downstream conveying direction A is elastically pressed in a direction from the tail F1 to the neck F5 over a width W in a range at least including ovaries F6 of the fish. Since the abdomen F3 is pressed by such pressing means 7, the ovaries F6 can be removed without disrupting or distorting the fish body F. Hence, plural fish bodies can be disposed closely together, and an interval L2 between adjacent fish bodies F in the conveying direction A can be shortened. Multiple fish bodies continuously can be provided by the roe removal process, and thus efficiency of processing can be enhanced significantly.

Figure 4:
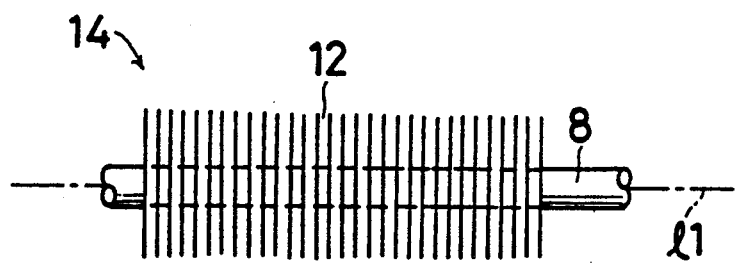
FIG. 4 is a sectional view seen from section line III—III in FIG. 2.
Figure 5:
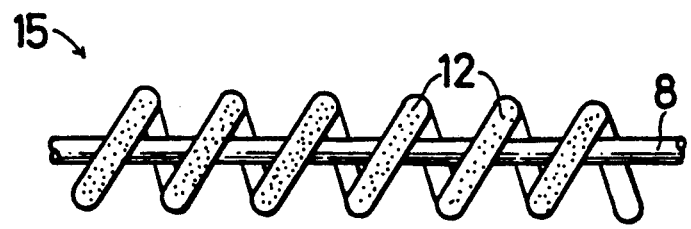
FIG. 5 is a schematic view showing a pressing member in a different embodiment of the invention.

In other embodiments of the invention, as shown in FIG. 4, it is possible to use pressing means 14 having pressing members 12 positioned along a longer length in the direction of axial line 11 of the rotary shaft 8, or, as shown in FIG. 5, pressing means 15 having spirally formed pressing members 12 also may be used.

Figure 6:
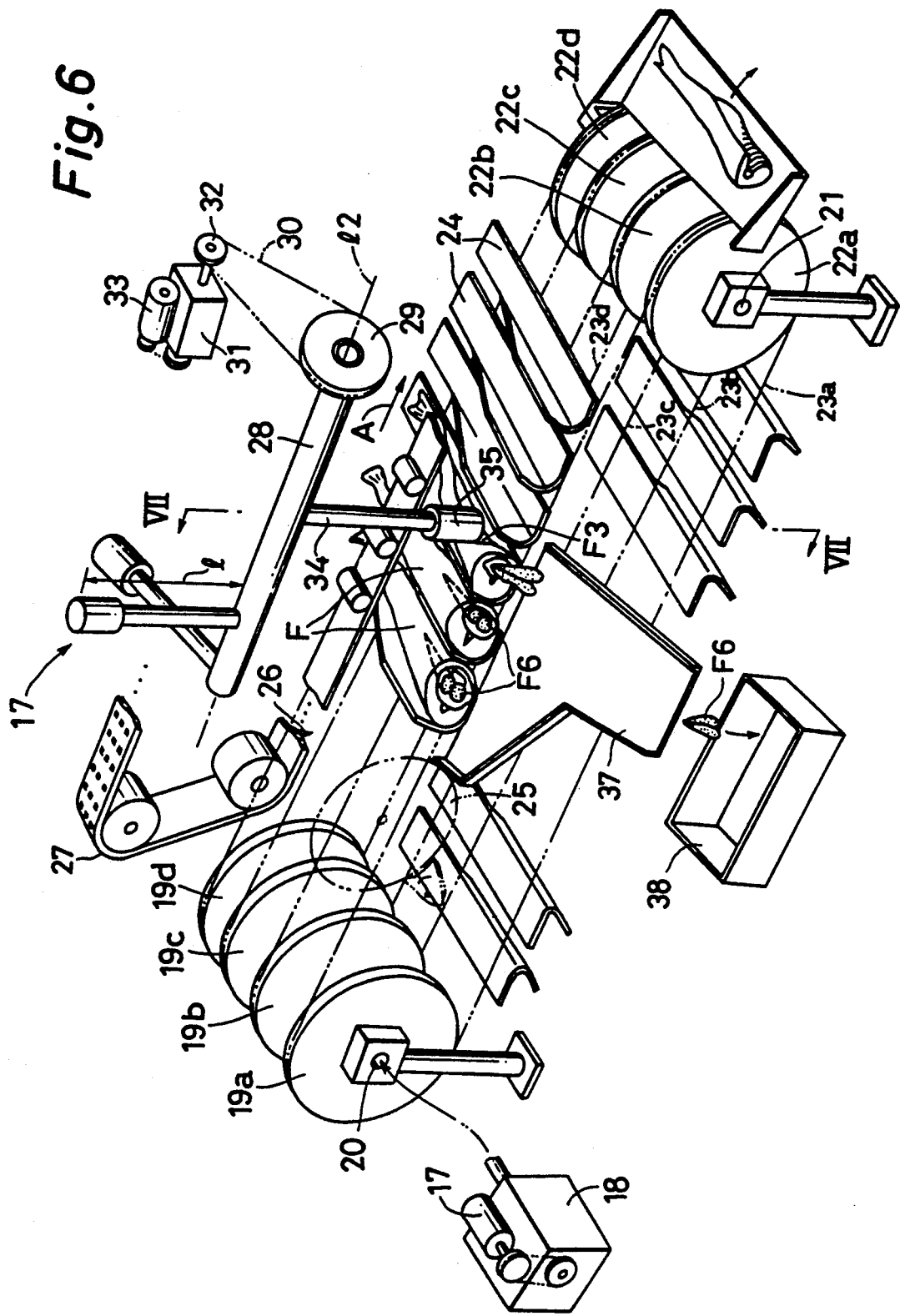
FIG. 6 is a perspective view of a further different embodiment of the invention.

FIG. 6 is a perspective view of a different embodiment of the invention. the rotation of a motor 17 is reduced by a reduction gear 18, and the rotation from the reduction gear 18 is transmitted to a rotary shaft 20 to which plural wheel s 19a to 19d are fixed. On a rotary shaft 21 having an axis parallel to the rotary axis of the rotary shaft 20, wheels 22a to 22d are fixed, respectively corresponding to the wheels 19a to 19d. Between and around each pair of wheels 19a to 19d and 22a to 22d extend respective chains 23a to 23d. On these chains 23a to 23d are fixed plural approximately L-shaped trays 24 positioned closely adjacent each other. On each tray 24 is positioned a fish body F having the head F2 removed by rotary round knife 25 and with the abdomen F3 directed in the downstream conveying direction A. The tile F1 of the fish body F thus mounted on the tray 24 is held on the tray 24 by a tail suppressing belt 27 which is provided with plural needles 26 spaced along the longitudinal direction.

Figure 7:
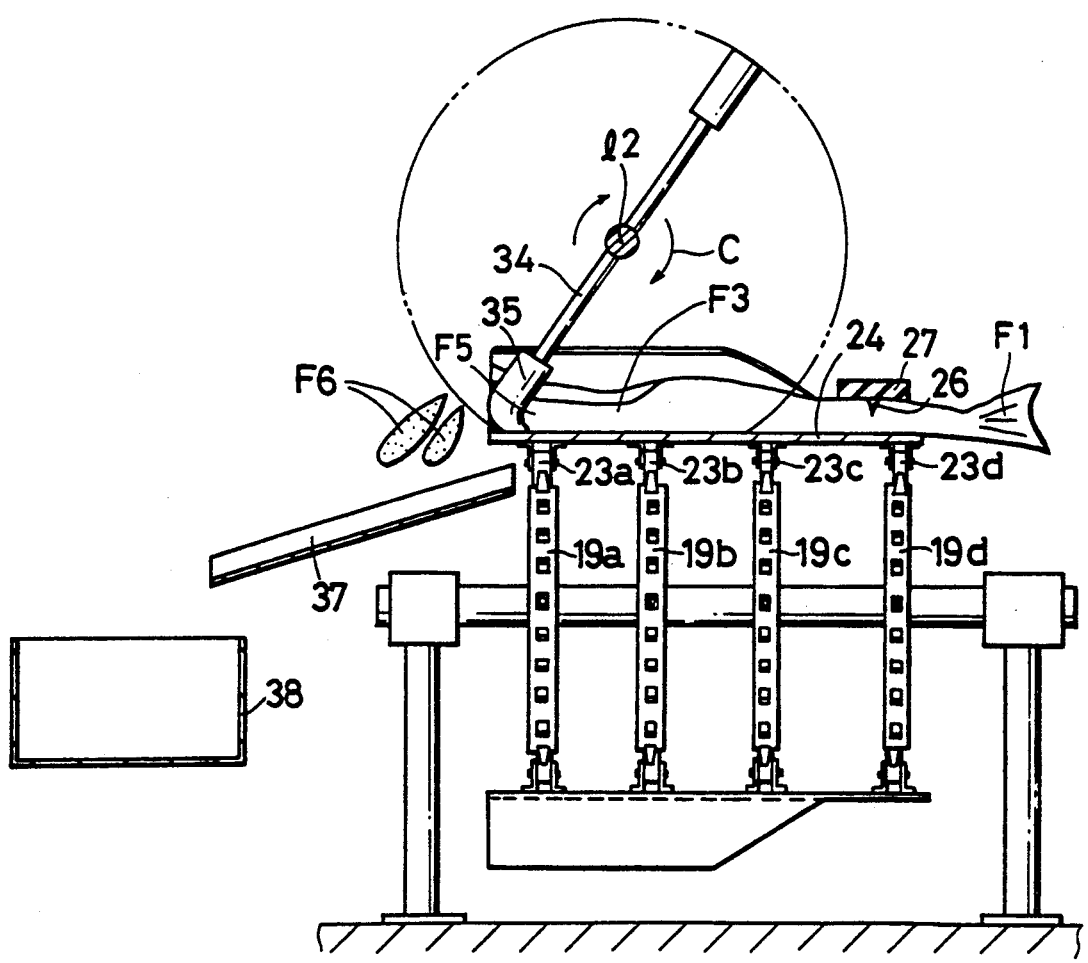
FIG. 7 is a sectional view as seen from section line VII—VII in FIG. 6.
Figure 8:
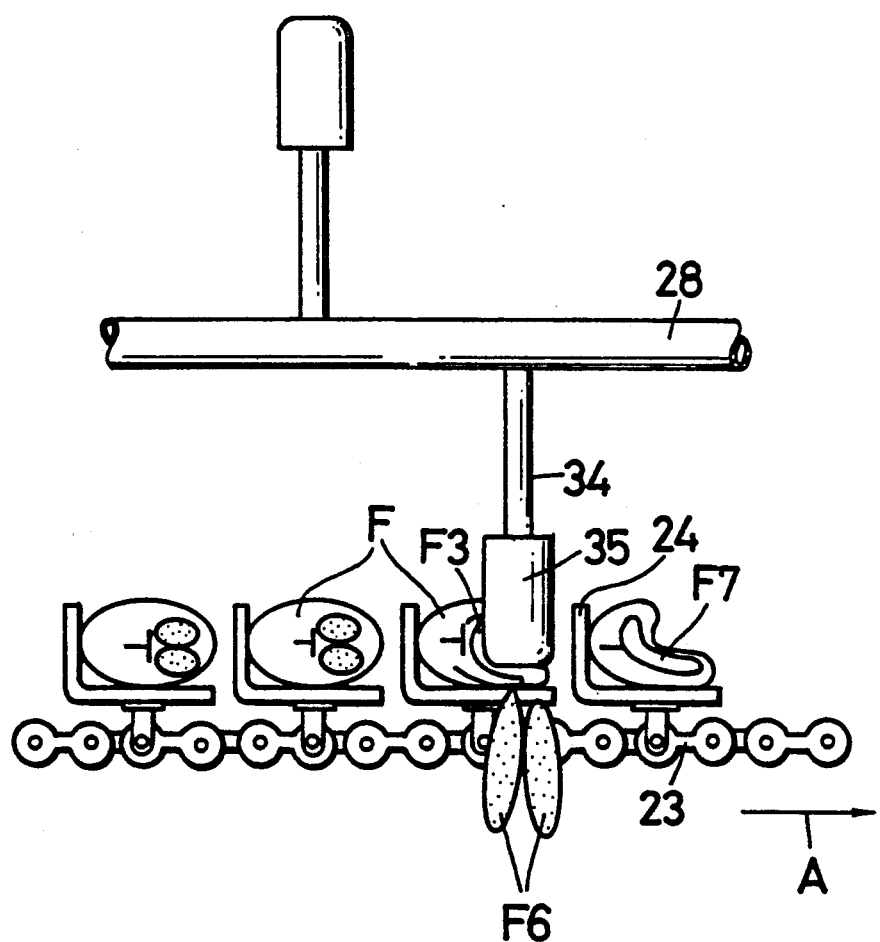
FIG. 8 is a sectional view in a direction transverse to the plane of FIG. 7.
Figure 9:
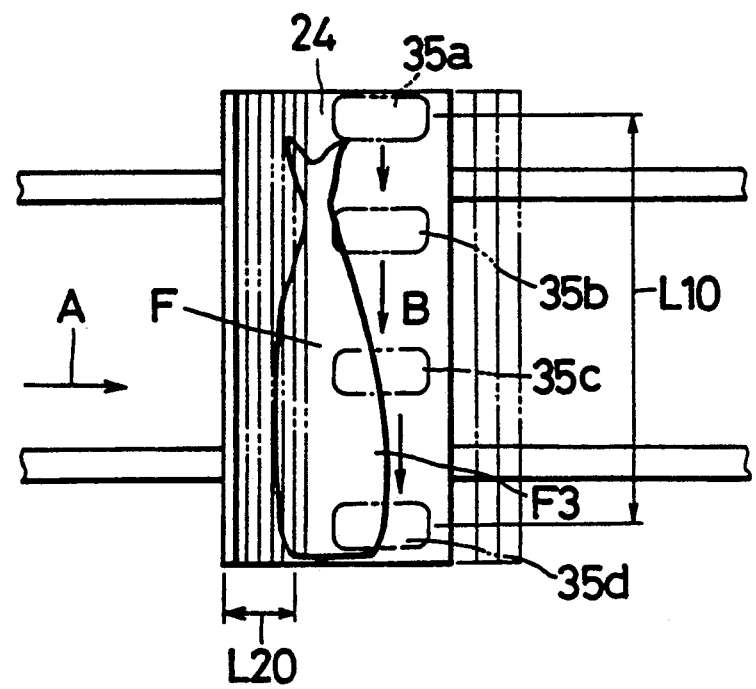
FIG. 9 is a schematic view illustrating a pressing action by a pressing piece.

A pulley 29 is fixed to a rotary shaft 28 having a rotary axis 12 parallel to the conveying direction A, and the power from a pulley 32 fixed to an output shaft of a reduction gear 31 is transmitted to pulley 29 through a belt 30. The power from a motor 33 is supplied to reduction gear 31. On the rotary shaft 28 are fixed plural arms 34 spaced at intervals in the direction of axis 12. At the free end portion of each arm 34 is fixed a pressing piece 35 made of flexible and elastic material such as rubber. As the arms 34 are rotated and driven in the direction of arrow C (FIG. 7) about the rotary axis 12, the pressing pieces 35 elastically press the abdomen F3 of the fish body F in a direction from the tail F1 to the neck F5. In this way, as the abdomen F3 of the fish body F is pressed by the pressing pieces 35, the ovaries F6 are pushed out of the abdominal cavity F7 of the fish body F, as shown in FIG. 7 and FIG. 8, and are collected in a container 38 via a chute 37. Arms 34 and pressing pieces 35 advance, as shown in FIG. 9, from positions 35a to 35b to 35c to 35d, and while moving by the distance L10 between positions 35a and 35d, the tray 24 is moved in the downstream conveying direction A by a distance L20. By setting the running speed of conveying chains 23a to 23d and the rotating speed of the rotary shaft 28, a predetermined relationship of the distances L10 and L20 can be achieved to ensure that the ovaries F6 can be securely pushed out of the abdominal cavity F7.

Figure 10:
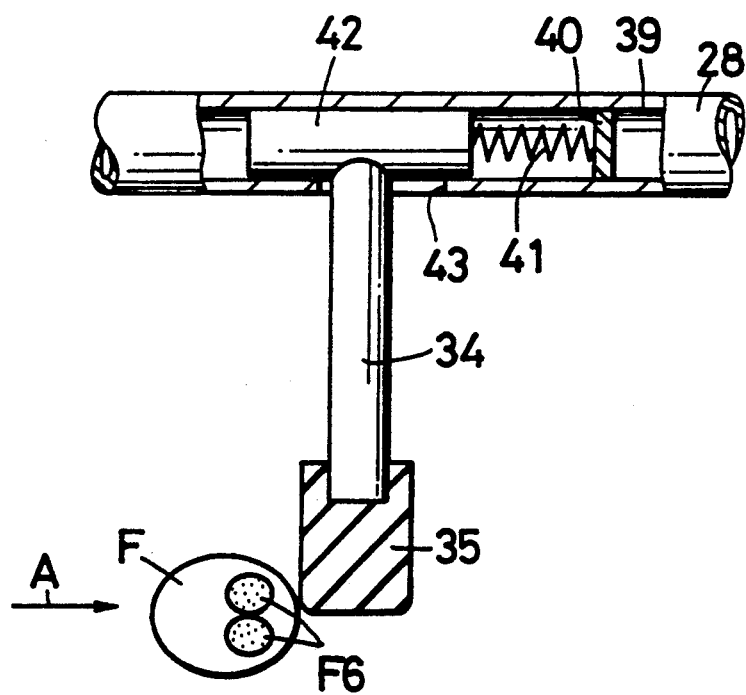
FIG. 10 is a partially cut-away sectional view showing a mounting position of an arm in another embodiment of the invention.

FIG. 10 is a partially cut-away sectional view illustrating a manner of mounting the arm 34 on the rotary shaft 28. The rotary shaft 28 is approximately in a cylindrical form, and a spring receiving member 40 is fixed in a central passage 39 thereof. One end of a compression coil spring 41 abuts against spring receiving member 40. The other end of the compression coil spring 41 elastically abuts against a moving element 42 which is fitted into the central passage 39 to be movable in the axial direction therealong. The rotary shaft 28 also has a slot 43 extending in the axial direction, and through slot 43 extends a base end portion of the arm 34 that is fixed to the moving element 42. Accordingly, the pressing piece 35 presses the abdomen F3 of the fish body F by the elastic force imparted to arm 34 from spring 451, in addition to the elastic force of piece 35. However, spring 41 allows give, such that the fish body F is not pressed by an extremely large force and therefore is not damaged.

Figure 11:
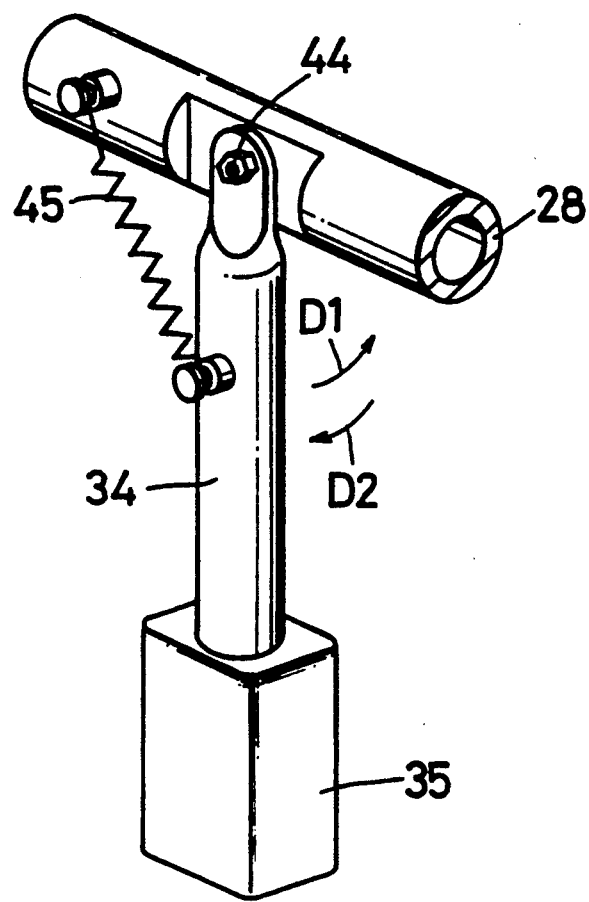
FIG. 11 is a perspective view showing amounting position of an arm in another different embodiment of the invention.

In another embodiment of the invention, as shown in FIG. 11, the base end portion of the arm 34 may be oscillatably pivoted in the directions of arrows D1, D2 to the rotary shaft 28 about a shaft 44. In this embodiment, one end of a tension spring 45 is mounted on the arm 34, and the other end of the tension spring 45 is mounted on the rotary shaft 28 at a position upstream from shaft 44 relative to conveying direction A. As a result, spring 45 urges the arm 34 in the direction of arrow D2. By such arrangement, the elastic force of the spring 45 through the arm 34 is added to the elastic force of the pressing piece 35 to elastically press the abdomen F3 of the fish body F.

Figure 12:
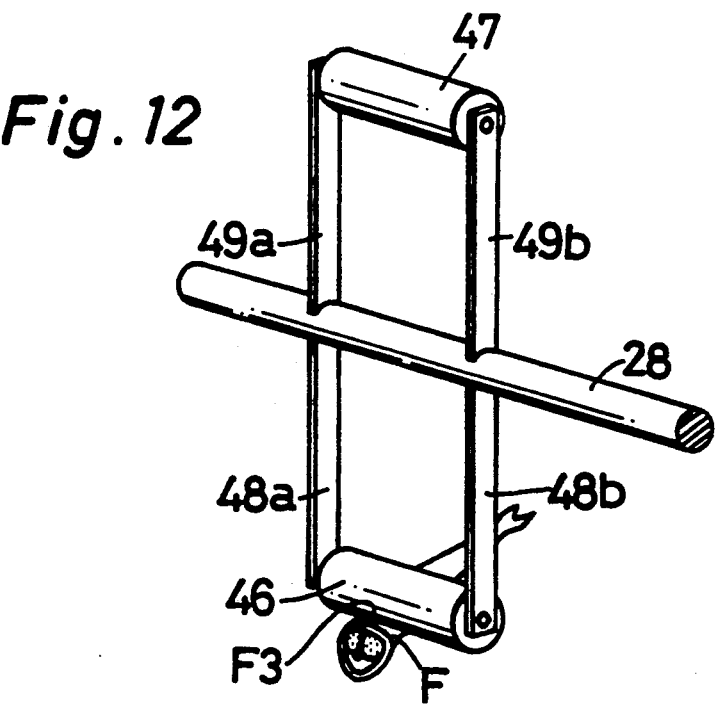
FIG. 12 is a perspective view showing a pressing means in still another embodiment of the invention.

In a further different embodiment of the invention, as shown in FIG. 12, rubber rollers 46, 47 extend parallel to the rotary shaft 28 and are rotatably mounted on free end portions of support members including respective brackets 48a, 48b and 49a, 49b. The abdomen F3 of the fish body F may be elastically pressed by rollers 46, 47. By extending the length of the rollers 46, 47 in the axial direction, abdomens of plural fish bodies may be pressed simultaneously. Meanwhile, the rollers 46, 47 shown in FIG. 12 are columnar or cylindrical in shape, but may be formed in other shapes, for example, a truncated conical shape widened in diameter in the downstream conveying direction.

Figure 13:
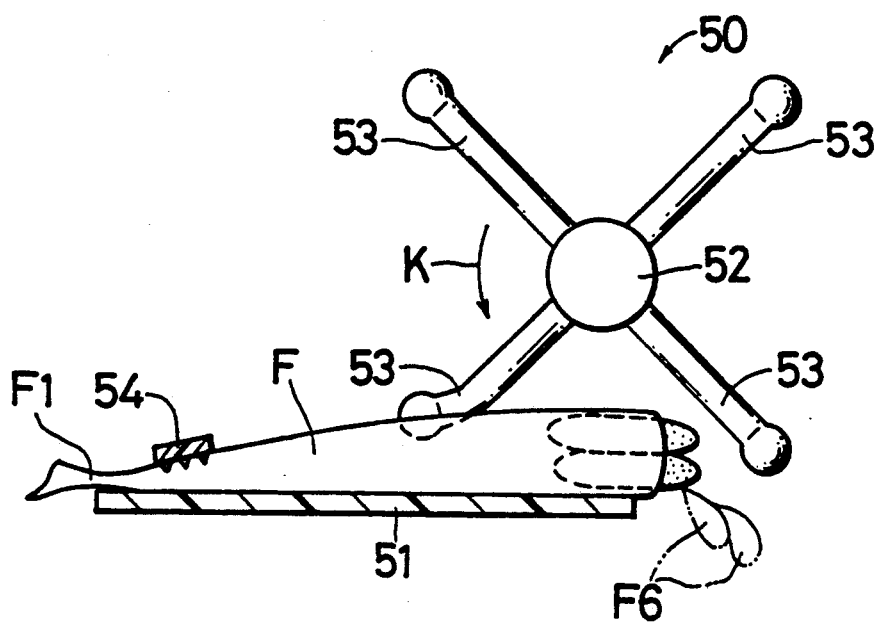
FIG. 13 is a partial sectional view showing a pressing means in a still further different embodiment of the invention.
Figure 14:
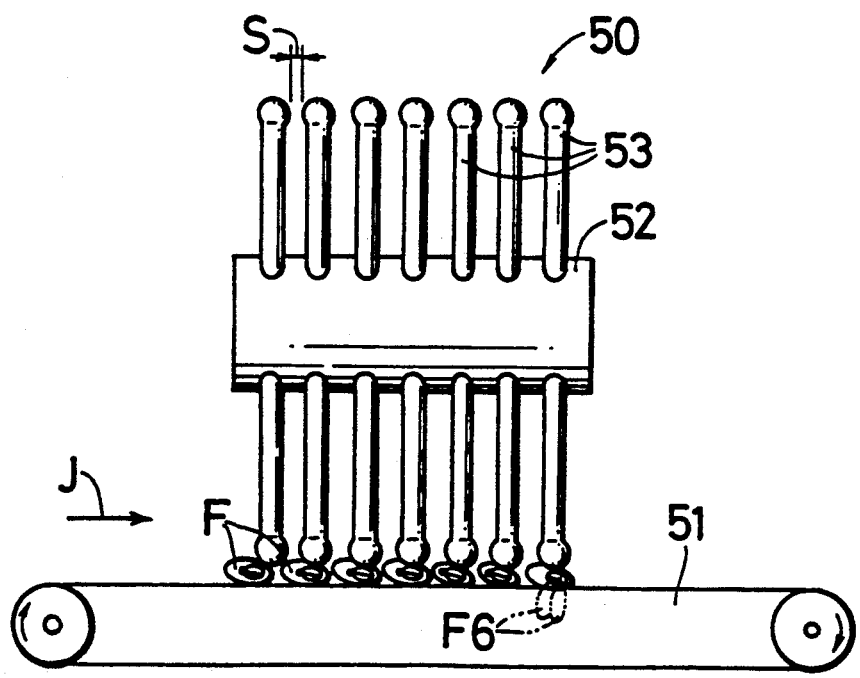
FIG. 14 is a front view as seen from the right side of FIG. 13.

FIG. 13 is a sectional view showing pressing means 50 in a different embodiment of the invention. FIG. 14 is a side view showing the pressing means 50 as seen from the right side of FIG. 13. On a rotary shaft 52 rotated and driven in the direction of arrow K about a rotary axis parallel to a conveying direction J of the fish body F placed horizontally on a conveying belt 51, are fixed substantially bar-shaped pressing members 53 made of flexible and elastic material such as rubber or synthetic resin. Members 53 are disposed in plural rows (four in the illustrated embodiment) spaced at intervals in the peripheral direction about shaft 52. Free end portions of members 53 are softer than base end portions thereof. The pressing members 53 are disposed at mutual intervals S in the axial direction of the rotary shaft 52, and the interval S is selected, for example, to be about 30 mm. The diameter of the end portion of each pressing member 53 is, for example, about 50 mm.

By disposing the pressing members 53 at slight intervals S in the axial direction of the rotary shaft 52, the mutual interval between fish bodies F put on the conveying belt 51 may be selected freely, and if the fish bodies passing beneath the pressing means 50 are placed at uneven intervals, the abdomens of all fish bodies still will be securely pressed by the pressing members 53. The vicinity of the root of the tail F1 of the fish body F is pressed on the conveying belt 51 by a pressing belt 54. Thus, the fish body F is prevented from moving or deviating in the rotating direction K of the pressing means 50 when the ovaries F6 are removed from the abdominal cavity of the fish body.

Figure 15:
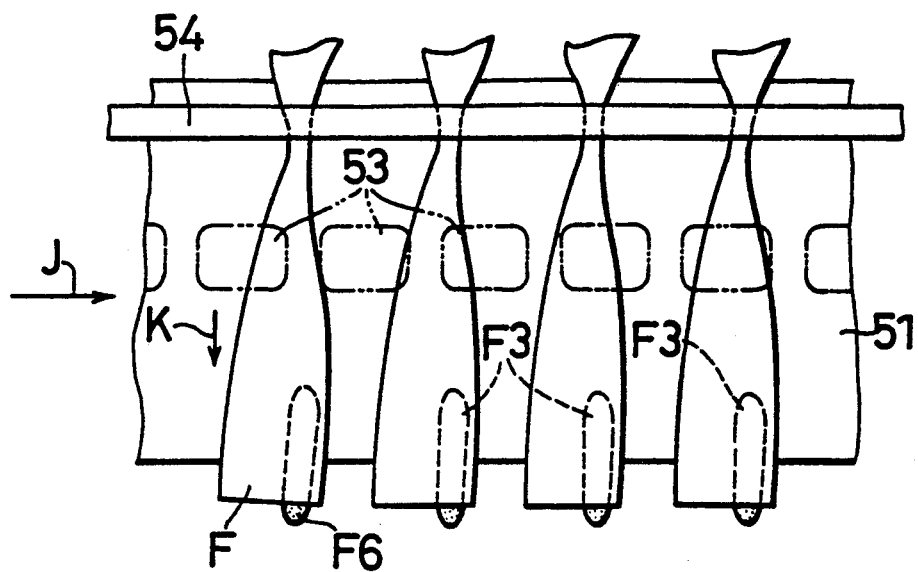
FIG. 15 is a plan view in part for explaining a roe removal action by a pressing means.

Moreover, since the pressing member 53 is made of flexible and elastic material such as rubber or synthetic resin and has a relatively long length from the rotary shaft 52 to the free end portion, as shown in FIG. 15, if a fish body is pressed at a position deviated from the abdomen thereof, for example, if some pressing members 53 contact immediately above fish bodies, due to a difference between the intervals between the fish bodies F in the conveying direction J and the interval between the pressing members 53, the pressing members 53 will be elastically deformed and the fish bodies F will not be damaged. Nevertheless, one of the plural pressing members 53 will press the abdomen F3 of each fish body from the tail thereof to the neck thereof to ensure that the ovaries F6 will be removed.

Figure 16:
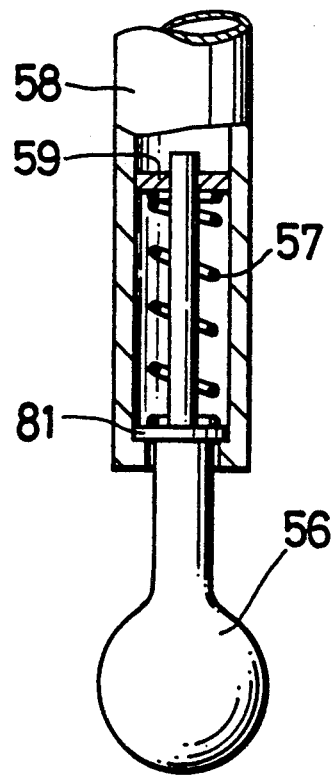
FIG. 16 is a sectional view showing a pressing member and its surrounding structure in a different embodiment of the invention.

In a further different embodiment of the invention, as shown in FIG. 16, a pressing member 56 may be designed to be pressed outwardly in a radial direction with respect to the rotary axis of the rotary shaft 52 by means of a compression spring 57. Compression spring 57 is positioned in a hollow cylindrical arm 58, and one end of spring 57 is supported by a stopper 59, while the other end of spring 57 presses outwardly against a flange 81 movable within arm 58 and connected to pressing member 56. By setting the spring force of the compression spring 57 at a magnitude suited to press the fish body F, the fish body may be pressed without being damaged, thereby to ensure removal of roe, regardless of deviation from a preferred position of the pressing member 56 with respect to the fish body F.

Figure 17:
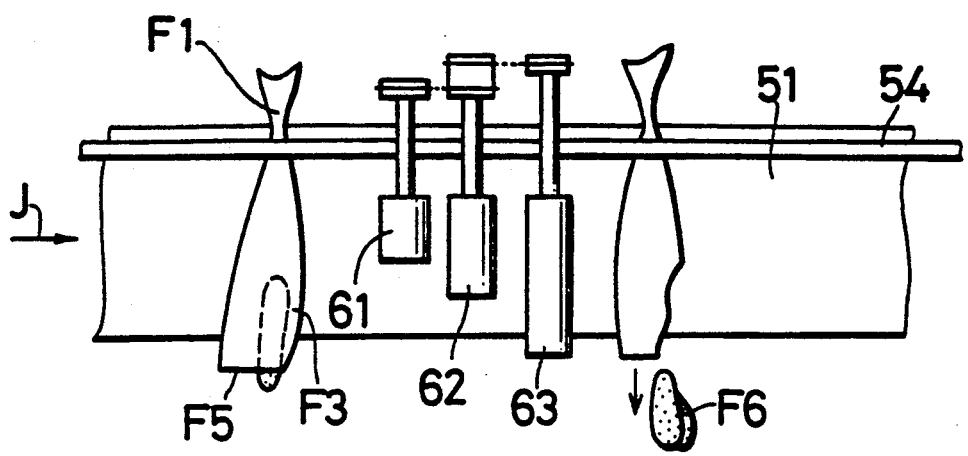
FIG. 17 is a simplified plan view of another embodiment of the invention.
Figure 18:
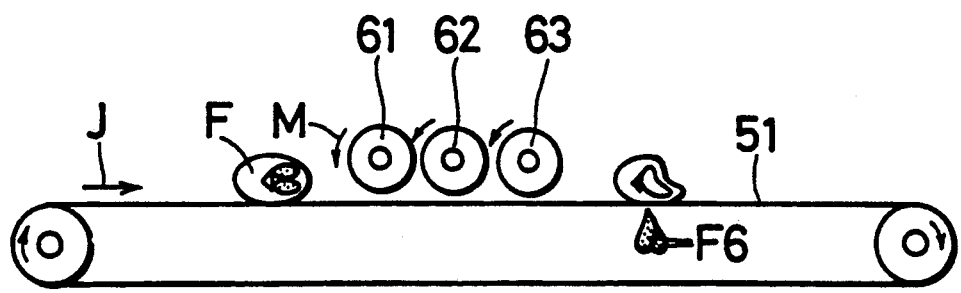
FIG. 18 is a side view of the embodiment shown in FIG. 17.

FIG. 17 is a plan view of another different embodiment of the invention, and FIG. 18 is a side view thereof. In this embodiment, rollers 61, 62, 63 are disposed along the conveying route of the fish bodies and form pressing members rotated and driven about respective a rotary axes transverse to conveying direction J. Rollers 61 to 63 are urged with a spring force in directions toward conveying belt 51 by elastic thrusting means such as springs (not shown). The axial lengths of rollers 61 to 63 increase from upstream rollers to downstream rollers, in the conveying direction J. Therefore, the upstream-most roller 61 presses near the anus of the fish body F, the second roller 62 presses the abdomen F3, and the downstream-most roller 63 presses the ovaries F6 out of the abdominal cavity. Rollers 61 to 63 may be made of rubber, or sponge or synthetic resin material. The rollers 61 to 63 may be rotated and driven in the direction of arrow M, or may be pivoted rotatably.

Figure 19:
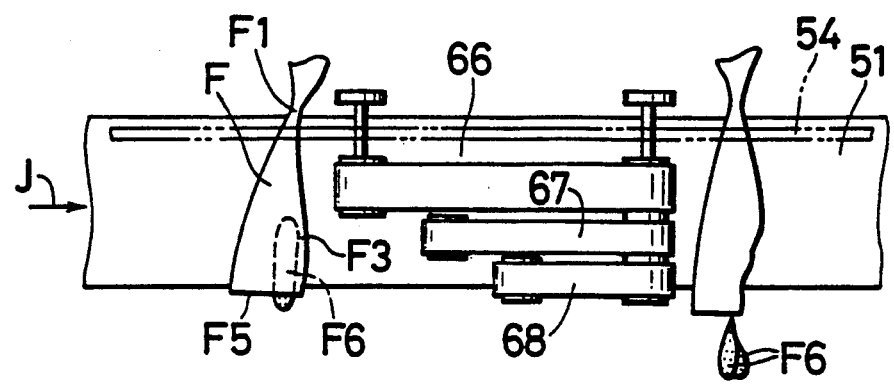
FIG. 19 is a simplified plan view of a further different embodiment of the invention.
Figure 20:
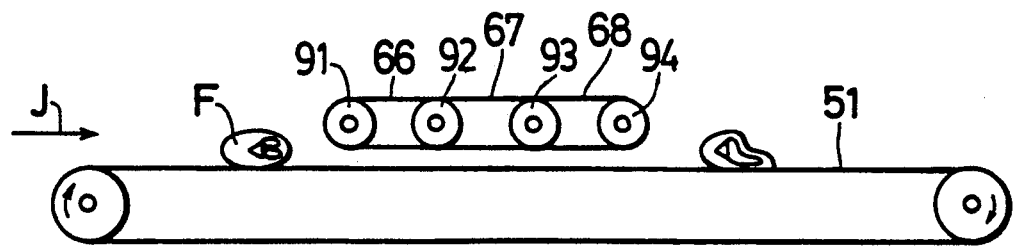
FIG. 20 is a side view of the embodiment shown in FIG. 19.

In a still different embodiment of the invention, as shown in FIG. 19 and FIG. 20, instead of the rollers 61 to 63, endless pressing belts 66 to 68 are mounted to press sequentially in the downstream conveying direction J respectively at the areas of tails F1 of fish bodies, the abdomens F3 thereof, and the ovaries F6 thereof. Each fish body F thus is pressed sequentially by belts 66 to 68 in the same manner as rollers 61 to 63, thereby ensuring removal of ovaries F6.

The pressing belts 66 to 68 may be made of rubber or other elastic material, or pulleys 91 to 94 on which the pressing belts 66 to 68 are mounted may be urged elastically downwardly. Meanwhile, in the embodiment shown in FIGS. 19 and 20, since the fish body F is pressed sequentially by the belts 66 to 68, deviations of alignment of fish bodies F is slight, and therefore the pressing belt 54 may be omitted.

Figure 21:
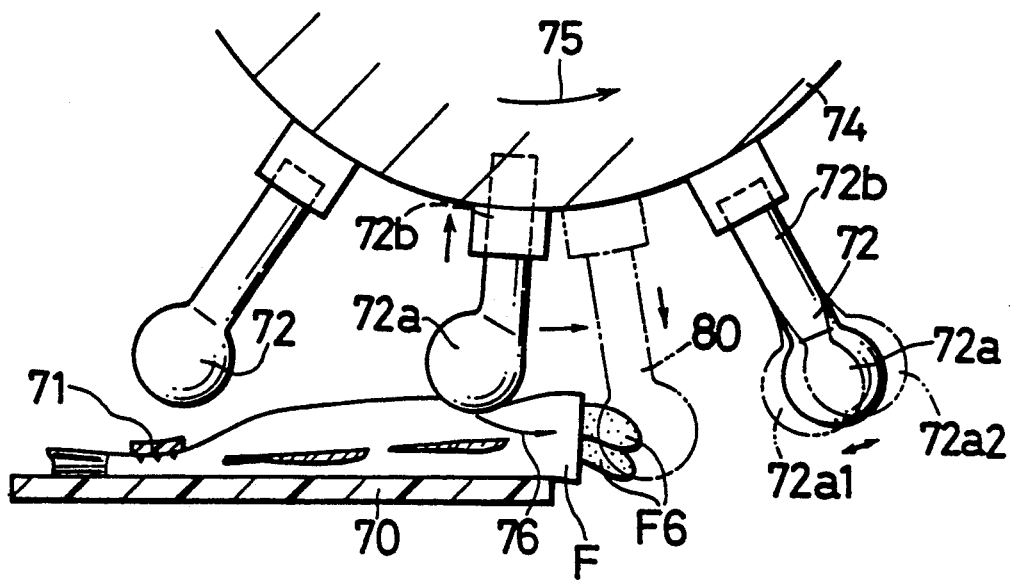
FIG. 21 is a partial sectional view of another different embodiment of the invention.

FIG. 21 is a partial sectional view of another embodiment of the invention. A fish body F is put on a conveying belt 70 in a position with the abdomen directed in the downstream conveying direction. The vicinity of the tail of the fish body F is elastically pressed by a pressing belt 71, and the abdomen is pressed by pressing members 72 made of flexible and elastic material such as rubber or synthetic rubber. Each pressing member 72 has a substantially spherical free end portion 72a, and a base end portion 72b is mounted on a rotary element 74 to be retractable in a radial direction thereinto. Member 72 is urged by a spring force in an outward radial direction by a compression spring (not shown). The free end portion 72a and its root area are made of a softer material than the base end portion 72b. By the action of an external force the free end portion 72a may be elastically bent near the root of the base end portion 72b, as indicated by phantom lines 72a1, 72a2 in FIG. 21. The rotary element 74 is rotated and driven in the direction of arrow 75 about a rotary axis parallel to the conveying direction of the fish body F. Rotation of the rotary element 74 causes the pressing member 72 to be dislocated from a position with free end portion 72a elastically abutting against the abdomen of a fish body F and bent in an upstream direction relative to rotating direction 75, as indicated by the solid line in FIG. 21, in the direction of arrow 76, to a position restored by its elastic restoring force as indicated by phantom line 80. While this occurs, member 72 is projected or urged radially outwardly and extends linearly in the radial direction of the rotary element 74. In this way, the abdomen of the fish body F is pressed toward the head end thereof by the action of, so to speak, a snapping force resulting from the elastic restoring force dislocating the free end portion 72a of the pressing member 72 in the rotating direction 75. As a result, the speed of removal of ovaries 76 is the sum of the rotating speed of the rotary element 74 in the direction of arrow 75 and the returning speed of the free end portion 72a in the direction of arrow 76. Thus, the roe collecting or removal speed is enhanced significantly.

Figure 22:
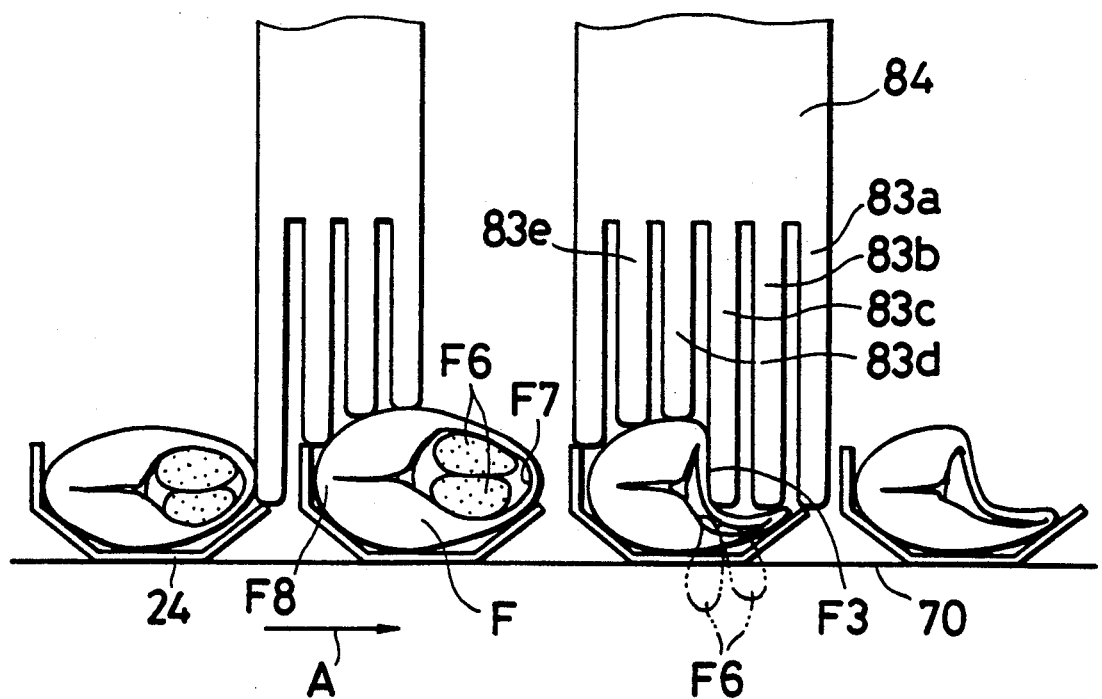
FIG. 22 is a side view of part of another different embodiment of the invention.

FIG. 22 is a partial front view of a further different embodiment of the invention. This embodiment is similar to the embodiment shown in FIG. 21, and corresponding parts are identified with the same reference numbers. On a rotating element are mounted pressure members 84 possessing plural (four or six in the illustrated embodiment) elastic finger elements, such as 83a to 83e. Such finger elements are disposed in plural rows at equal intervals in the circumferential direction. The finger elements of each row are spaced in the axial direction of the rotating element. These pressure members 84 are made of flexible and elastic material, and are designed to elastically push the abdomen F3 of the fish body F conveyed in downstream conveying direction A, thereby pushing out the ovaries F6 from the abdominal cavity F7. When the conveying belt 70 is driven in the downstream conveying direction A, a tray 24 and fish body F thereon are brought into contact with the finger elements which therefore are pressed to deform the conveying direction A. However, the finger elements also are deformed elastically in a direction opposite to the direction of rotation of the rotating body while pushing a fish body F. Since the abdomen F3 of the fish body F is relatively soft as compared with a dorsal part F8 thereof, the finger elements pressing the abdomen F3 are relatively less deformed rotationally and rather are relatively extended. When the dorsal part F8 which is stiffer than the abdomen F3 and the tray 24 pass through, the respective finger elements are elastically more greatly deformed and curved, depending on the extent of contact. Thus, the roe can be collected smoothly without disturbing the movement of the fish body F in the conveying direction.

The invention may be embodied in other specific forms without departing from the spirit or essential characteristics thereof. The present embodiments are therefore to be considered in all respects as illustrative and not restrictive, the scope of the invention being indicated by the appended claims rather than by the foregoing description, and all changes which come within the meaning and the range of equivalency of the claims are therefore intended to be embraced therein.

What is claimed is:

1. A roe removing apparatus comprising:
   means for conveying decapitated fish bodies in a downstream conveying direction; and
   means for elastically pressing an abdomen area of each fish body on said conveying means, from a tail end thereof to a neck end thereof, and thereby for forcing roe outwardly of the fish body through the neck end thereof, said pressing means comprising:
   a rotary shaft rotatably mounted to be driven about a horizontal rotary axis inclined to said conveying direction and diverging therefrom in a direction downstream thereof and from tail ends to neck ends of fish bodies on said conveying means;
   a cylindrical base element having therethrough a central passage through which extends said rotary shaft, said base element being fixed to said rotary shaft;
   a plurality of pressing members fixed to an outer circumference of said base element and extending radially outwardly thereof; and
   a cover member formed of flexible and elastic material and mounted to surround said plurality of pressing members.

2. A roe removing apparatus comprising:
   means for conveying decapitated fish bodies in a downstream conveying direction;
   means for elastically pressing an abdomen area of each fish body on said conveying means, from a tail end thereof to a neck end thereof, and thereby for forcing roe outwardly of the fish body through the neck end thereof, said pressing means comprising:
   a rotary shaft rotatably mounted to be driven about a rotary axis extending parallel to said conveying direction;
   a plurality of arms fixed to said rotary shaft at positions spaced at intervals along said rotary axis, each said arm having an outer free end; and
   a respective pressing member formed of a flexible and elastic material and fixed to said free end of each respective said arm.

3. An apparatus as claimed in claim 2, wherein said rotary shaft is of a cylindrical configuration having therethrough an axial passage, and further comprising, for each said arm, a spring mounted in said passage for urging the respective said arm therein in a direction upstream of said downstream conveying direction, said arm being movable against the spring force of said spring in a downstream direction within said passage.

4. An apparatus as claimed in claim 2, wherein each said arm has a base end pivoted to said rotary shaft for movement relative thereto in opposite angular directions upstream and downstream of said conveying direction.

5. A roe removing apparatus comprising:
   means for conveying decapitated fish bodies in a downstream conveying direction; and
   means for elastically pressing an abdomen area of each fish body on said conveying means, from a tail end thereof to a neck end thereof, and thereby for forcing roe outwardly of the fish body through the neck end thereof, said pressing means comprising:
   a rotary shaft rotatably mounted to be driven about a rotary axis extending parallel to said conveying direction;
   a plurality of pairs of support members having base ends fixed to said rotary shaft and free outer ends; and
   a flexible and elastic roller pivotally connected to said free outer ends of each respective said pair of support members and extending parallel to said rotary axis.

6. A roe removing apparatus comprising:
   means for conveying decapitated fish bodies in a downstream conveying direction;
   means for elastically pressing an abdomen area of each fish body on said conveying means, from a tail end thereof to a neck end thereof, and thereby for forcing roe outwardly of the fish body through the neck end thereof, said pressing means comprising:
   a rotary shaft rotatably mounted to be driven about a rotary axis extending parallel to said conveying direction; and
   a plurality of flexible and elastic pressure members mounted on and extending outwardly from said rotary shaft, said plurality of flexible members being arranged in plural rows extending parallel to said rotary axis and spaced at intervals circumferentially about said rotary axis.

7. A roe removing apparatus comprising:
   means for conveying decapitated fish bodies in a downstream conveying direction;
   means for elastically pressing an abdomen area of each fish body on said conveying means, from a tail end thereof to a neck end thereof, and thereby for forcing roe outwardly of the fish body through the neck end thereof, said pressing means comprising:
   a rotary shaft rotatably mounted to be driven about a rotary axis extending parallel to said conveying direction; and
   a plurality of pressing members extending outwardly from said rotary shaft, each said pressing member including a base end portion mounted in said rotary shaft to be elastically projected therefrom and an approximately spherical free end portion connected to said base end portion, said free end portion and a root area thereof being softer than said free end portion.

8. A roe removing apparatus comprising:
   means for conveying decapitated fish bodies in a downstream conveying direction;
   means for elastically pressing an abdomen area of each fish body on said conveying means, from a tail end thereof to a neck end thereof, and thereby for forcing roe outwardly of the fish body through the neck end thereof, said pressing means comprising:
a rotary shaft rotatably mounted to be driven about a rotary axis extending parallel to said conveying direction; and
a plurality of pressure members extending outwardly from said rotary shaft, each said pressure member having a base end portion fixed to said rotary shaft and a free end portion in the form of plural flexible and elastic finger elements.

9. An apparatus as claimed in claim 8, wherein said plural finger elements of each said pressure member are spaced in said conveying direction.

* * * * *